(12) United States Patent
Mitzkus et al.

(10) Patent No.: US 8,563,912 B2
(45) Date of Patent: Oct. 22, 2013

(54) MICROSCOPE HAVING FOCUS-HOLDING UNIT

(75) Inventors: Reiner Mitzkus, Goettingen (DE); Eugen Wehner, Goettingen (DE); Stefan Steinborn, Bovenden (DE); Gleb Milinovici, Goettingen (DE); Steffen Leidenbach, Reinhausen (DE); Peter Westphal, Jena (DE)

(73) Assignee: Carl Zeiss Microimaging GmbH, Jena (DE)

( * ) Notice: Subject to any disclaimer, the term of this patent is extended or adjusted under 35 U.S.C. 154(b) by 384 days.

(21) Appl. No.: 12/937,970

(22) PCT Filed: Apr. 4, 2009

(86) PCT No.: PCT/EP2009/002503
§ 371 (c)(1),
(2), (4) Date: Oct. 14, 2010

(87) PCT Pub. No.: WO2009/127337
PCT Pub. Date: Oct. 22, 2009

(65) Prior Publication Data
US 2011/0043905 A1    Feb. 24, 2011

(30) Foreign Application Priority Data
Apr. 15, 2008    (DE) .......................... 10 2008 018 951

(51) Int. Cl.
*G02B 27/40*    (2006.01)
(52) U.S. Cl.
USPC ...................................................... 250/201.3
(58) Field of Classification Search
USPC ...................................................... 250/201.3
See application file for complete search history.

(56) References Cited

U.S. PATENT DOCUMENTS

| 5,389,774 A | * | 2/1995 | Gelman et al. | 250/201.1 |
| 5,438,190 A | * | 8/1995 | Kaneda et al. | 250/201.3 |
| 5,703,714 A | * | 12/1997 | Kojima | 359/368 |
| 5,712,725 A | | 1/1998 | Faltermeier et al. | |
| 5,781,303 A | * | 7/1998 | Berndt | 356/632 |
| 5,841,149 A | | 11/1998 | Spink et al. | |
| 5,953,114 A | * | 9/1999 | Spink et al. | 356/152.1 |

(Continued)

FOREIGN PATENT DOCUMENTS

| DE | 195 48 091 A1 | 7/1996 |
| EP | 1 178 344 A1 | 2/2002 |

(Continued)

OTHER PUBLICATIONS

Schroeder, Gottfried, "Technische Optik," 1998. Vogel Fachbuch, Wuerzburg, XP002551303, pp. 22-23.

*Primary Examiner* — Mark Consilvio
(74) *Attorney, Agent, or Firm* — Patterson Thuente Pedersen, P.A.

(57) ABSTRACT

The invention relates to a microscope having a stage for supporting a sample to be examined, a recording sensor, an imaging optic for imaging the sample onto the recording sensor, a moving unit by means of which the distance between the stage and the imaging optic can be changed, a control unit for controlling an image recording of the sample and a focus-holding unit for maintaining a prescribed focal position for image recording of the sample at temporal intervals, wherein the focus-holding device comprises at least one hardware element and one software module, wherein the focus-holding unit is fully integrated in the control unit, on both the hardware and software sides.

15 Claims, 3 Drawing Sheets

(56) References Cited

U.S. PATENT DOCUMENTS

| | | | |
|---|---|---|---|
| 6,043,475 A * | 3/2000 | Shimada et al. | 250/201.3 |
| 6,128,129 A * | 10/2000 | Yoneyama | 359/383 |
| 7,068,426 B2 * | 6/2006 | Bruehl et al. | 359/378 |
| 7,133,078 B2 * | 11/2006 | Nagasawa | 348/353 |
| 7,262,843 B2 | 8/2007 | Hummel | |
| 8,143,562 B2 * | 3/2012 | Kawanabe | 250/201.2 |
| 2002/0024006 A1 | 2/2002 | Engelhardt | |
| 2002/0176160 A1 * | 11/2002 | Suzuki et al. | 359/380 |
| 2002/0186464 A1 | 12/2002 | Schmalz | |
| 2003/0090789 A1 | 5/2003 | Herz et al. | |
| 2006/0022114 A1 * | 2/2006 | Kennedy et al. | 250/201.3 |
| 2006/0098213 A1 | 5/2006 | Itoh et al. | |
| 2007/0152130 A1 * | 7/2007 | Fomitchov | 250/201.3 |
| 2007/0177470 A1 * | 8/2007 | Marshall | 369/44.28 |
| 2008/0272274 A1 * | 11/2008 | Krief et al. | 250/201.3 |
| 2009/0074284 A1 * | 3/2009 | Zeineh et al. | 382/133 |
| 2010/0033811 A1 | 2/2010 | Westphal et al. | |

FOREIGN PATENT DOCUMENTS

| | | |
|---|---|---|
| EP | 1 421 506 A2 | 9/2002 |
| EP | 1 460 376 A1 | 9/2004 |
| GB | 2 305 265 A | 4/1997 |
| WO | WO 95/27918 | 10/1995 |
| WO | WO 02/31572 A2 | 4/2002 |
| WO | WO 03/044495 A2 | 5/2003 |
| WO | WO 2007/144197 A1 | 12/2007 |

* cited by examiner

MICROSCOPE HAVING FOCUS-HOLDING UNIT

PRIORITY CLAIM

The present application is a National Phase entry of PCT Application No. PCT/EP2009/002503, filed Apr. 4, 2009, which claims priority from German Application Number 102008018951.0, filed Apr. 15, 2008, the disclosures of which are hereby incorporated by reference herein in their entirety.

FIELD OF THE INVENTION

The invention relates to a microscope with a stage for supporting a sample to be examined, an image sensor, imaging optics for mapping the sample onto the image sensor, a motion unit for adjusting the distance between stage and imaging optics, a control unit for controlling of an image acquisition of the sample.

BACKGROUND OF THE INVENTION

A microscope with a retaining focus unit is utilized particularly for the observation of processes that take place temporally over several hours or even several days in order to ensure that all exposures are taking place in the same focal position and/or imaging position.

Previously known retaining focus units are designed as a module separate from the microscope and which is subsequently attached and connected to an existing microscope. A separate control panel is usually provided for operation. This causes the handling and/or the use of the retaining focus unit to be elaborate and inconvenient. In particular, the required space increases since an additional control panel is required.

SUMMARY

In an embodiment the invention is a microscope with a stage for supporting a sample to be examined, an image sensor, imaging optics for mapping the sample onto the image sensor, a motion unit for adjusting the distance between stage and imaging optics, a control unit for controlling of an image acquisition of the sample, and a retaining focus unit for maintaining a predetermined focal position for temporally spaced image acquisitions of the sample, whereby the retaining focus unit contains at least one hardware element and one software element.

Based on the aforementioned, it is a feature and advantage of embodiments of the invention to further develop a microscope of the initially described type in such a way that the retaining focus unit can be provided simply and with minimal required space.

According to embodiments of the invention, the retaining focus unit, with regard to software as well as hardware, is fully integrated in the control unit.

In embodiments of the invention, a separate control panel for the retaining focus unit becomes unnecessary. The control and/or the input and output of information for the retaining focus unit can be effected via the output/input unit, usually already present in the microscope.

Furthermore, in embodiments of the invention, the complete integration of the retaining focus unit in the control unit of the microscope offers a multitude of advantages for the operation of the microscope.

For example, the retaining focus unit can access all technically relevant data of the microscope and take them into account for the maintaining of the predetermined focal position. This refers particularly to data that characterize the imaging optics, such as magnification, depth of field, the applied wavelengths, etc.

Through the integration of the retaining focus unit in the control unit of the microscope, according to embodiments of the invention, the retaining focus functionality can be seamlessly integrated in the operating concept of the microscope without requiring an additional control panel and/or special software for the control of the retaining focus functionality. In addition, the retaining focus unit can execute an independent calibration with unknown microscope lenses of the imaging optics and/or determine the magnification of the imaging optics by means of the retaining focus unit. Furthermore, microscope data, which describe technical properties of the microscope, can be prompted by the retaining focus unit and utilized for maintaining the predetermined focal position. The retaining focus unit can, for its part, store the ascertained data for the microscope in a respective memory.

If the imaging optics exhibit lens systems with chips for the storage of lens data, in embodiments of the invention, the retaining focus unit can read said chips and/or describe said chips.

Moreover, in embodiments of the invention, the retaining focus unit can determine a cover glass thickness and/or the thickness of the bottom of a vessel in which the sample was placed, such as a Petri dish or a culture vessel. It is also possible to automatically determine a desired focal position by means of the retaining focus unit.

Particularly, in embodiments of the invention, different modes of operation of the microscope can be implemented by means of the retaining focus unit. Said modes of operation can refer to the determination of the magnification of the imaging optics, determination of the cover glass thickness and/or bottom thickness of a vessel for the sample, and/or the determination of a desired focal plane.

In embodiments of the invention, the retaining focus unit can control the motion unit for maintaining the predetermined focal position. Particularly, the retaining focus unit can approach a predetermined focal and/or imaging position (e.g., after the stage was greatly displaced in the imaging direction in order to manipulate or change the sample) automatically or upon request by the operator.

The retaining focus unit can also control additional components of the microscope. It can, for example, execute a lens change if deemed necessary.

In embodiments of the invention, for maintaining the predetermined focal position, a set object position is maintained optically constant to the imaging optics. In other words, the optical path length is maintained constant.

The control unit in the microscope, according to embodiments of the invention, can exhibit an assigned memory that the retaining focus unit can access through writing and/or reading. The memory can, particularly, be integrated as a hardware element directly in the control unit 9 or be connected to said unit. The retaining focus unit can, for example, store and/or write in collected, technically relevant microscope data, such as magnification of the currently applied lens system of the imaging optics, in the memory of the control unit 9. Furthermore, the retaining focus unit can naturally also access the memory of the control unit with a reading function in order to read technically relevant microscope data stored therein and to take into account for the retaining focus control.

Moreover, in embodiments of the invention, additional components of the microscope can access the memory of the control unit. Thereby, this can, once again, relate to access for writing and/or reading.

In embodiments of the invention, the microscope can exhibit at least one lens system with a memory that the retaining focus unit can access through writing and/or reading. The memory of the lens system preferably contains data that characterize the lens system and its properties. Of course, the imaging system of the microscope can exhibit several lens systems that can be selectively introduced into the imaging beam path by means of a nosepiece. Said several lens systems can exhibit a memory each, which the retaining focus unit can access individually through writing and/or reading.

Furthermore, in embodiments of the invention, it is possible for additional components of the microscope to access the memory of the lens system and/or systems.

The microscope can be designed as a reflected light microscope or a transmitted light microscope, as a confocal microscope and/or a laser-scanning microscope. Moreover, the microscope can be realized as a fluorescence microscope. The microscope can comprise an illumination unit.

In embodiments of the invention, the retaining focus unit (particularly, the optical realization) can be designed, e.g., as described in WO2007/144197 A1. Of course, a similar design of the retaining focus unit is also possible. The content of WO2007/144197 A1 is herewith incorporated in the application by reference.

Furthermore, in embodiments of the invention, a microscopy method is provided, whereby, under the control of a control unit, temporally spaced images of a sample to be examined are mapped via imaging optics, which maps the sample onto an image sensor, whereby a retaining focus unit, which contains at least one hardware element and one software module, is provided for maintaining a predetermined focal position for the temporally spaced image acquisitions of the sample, and whereby the retaining focus unit, with regard to software as well as hardware, is also fully integrated in the control unit.

With the microscopy method, according to embodiments of the invention, the retaining focus functionality can be seamlessly integrated in the operating concept of the control unit, which, overall, leads to an easier to operate microscope.

With the microscopy method, according to embodiments of the invention, the magnification of the imaging optics can be determined by means of the retaining focus unit. For example, this can be realized in such a way that the retaining focus unit detects the sample to be examined via the imaging optics; thereby, the distance between imaging optics and sample is varied. From the resulting change of the detected signal (for example, a shift of the detected signal in a plane of a focus measurement sensor of the retaining focus unit), the magnification of the imaging optics can subsequently be derived.

In addition, the method, according to embodiments of the invention, allows for the determination of the thickness of a cover glass, under which the sample was placed, or the thickness of the bottom of a vessel in which the sample was placed, by means of the retaining focus unit.

Such thickness determination can, for example, according to embodiments of the invention, be executed in such a way that the retaining focus unit illuminates the cover glass and/or the bottom of the vessel and thereby detects the reflections produced on the top side and the bottom side of the cover glass and/or the bottom of the vessel and therefrom derives the thickness to be determined. The detection of the reflections from top and bottom side are preferably detected under equal imaging conditions. For example, the two reflections can be mapped simultaneously on a focus measurement sensor of the retaining focus unit.

For thickness determination, the retaining focus unit can furthermore, in embodiments of the invention, illuminate the cover glass and/or the bottom of the vessel and change the distance between the imaging optics and cover glass and/or the bottom of the vessel in such a way that the reflections produced on the top and bottom side of the cover glass and/or the bottom of the vessel are detected in temporal sequence and the thickness to be determined is derived while taking the change in distance into account.

The microscopy method, according to embodiments of the invention, can further exhibit steps that are executed during the operation of the microscope (including its upgrades), according to the invention.

It is understood that the aforementioned as well as the following characteristics still to be described are applicable not only in the described combinations but also in other combinations or unique characteristics without departing from the scope of the invention described herein.

DESCRIPTION OF THE DRAWINGS

In the following, the invention shall be further explained by way of examples through the attached drawings, which also disclose invention-essential characteristics. It is shown in.

DETAILED DESCRIPTION

Figure 1:
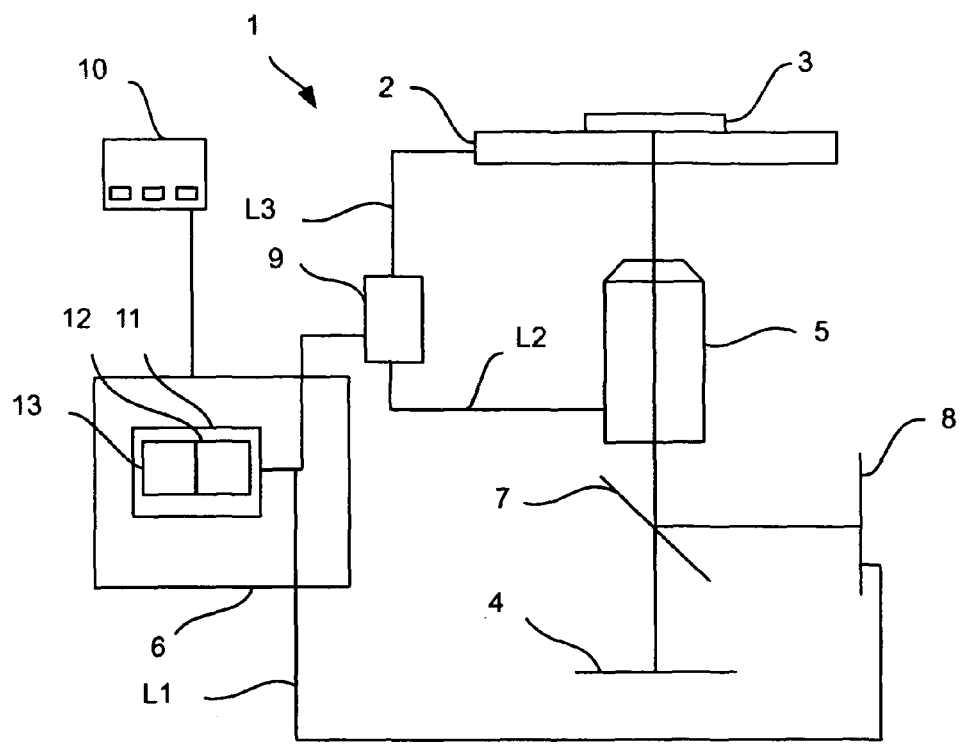
FIG. 1 is a schematic view of an embodiment of the microscope, according to the invention.

The embodiment in FIG. 1 comprises the microscope 1, according to the invention, which is preferably designed as an inverted microscope, a stage 2 which holds a sample 3, an image sensor 4 as well as imaging optics 5, which map the sample 3 onto the image sensor 4.

Moreover, the microscope 1 contains a motion unit 6, which can adjust and readjust the distance between the imaging optics 5 and the stage 2 and therefore sample 3, along the imaging direction of the imaging optics 5.

Between imaging optics 5 and the image sensor 4, a partially transparent mirror 7 is positioned which allows the radiation for the mapping of sample 3 onto the image sensor 4 to pass almost unaltered and which deflects the focus measurement radiation (e.g., infrared radiation) onto the focus measurement sensor 8. The focus measurement radiation is produced, e.g., with a radiation source (not shown), arranged in the area of the focus measurement sensors 8, mapped via the mirror 7 and imaging optics 5 onto the sample 3, reflected from the sample 3 and deflected via imaging optics 5 and the mirror 7, as already mentioned, onto the focus measurement sensor 8. The focus measurement sensor 8 emits a signal to the control unit 9 of the microscope 1. In addition, the control unit 9 is connected with the motion unit 6.

With the motion unit 6, the distance (in observational direction) between the imaging optics 5 and the stage 2 and therefore sample 3, can be altered. This is indicated through lines L2 and L3. Preferably, the motion unit 6 either moves only the imaging optics 5 or the stage 2. This simplifies the mechanical configuration.

The control unit 9 serves as control of the microscope and particularly for the execution of an image acquisition of the sample 3.

The image sensor 4 is connected to a control module not depicted herein.

The control unit 9 is connected to an output/input unit 10, which, e.g., can be designed as a touch-activated screen.

Furthermore, the control unit 9 contains a retaining focus unit 11 with at least one hardware element 12 and one software module 13. The retaining focus unit 11 can be set in a first position, whereby, for maintaining a predetermined focal position, it changes the distance between the stage 2 and the imaging optics 5 by means of the motion unit 6, and in a second position, whereby it effects no change in distance. The retaining focus unit 11 is used preferably for microscopic examinations, which can temporally stretch over several hours or even several days, while set in the first position in order to ensure that the focal position is maintained permanently.

As indicated in the schematic depiction in FIG. 1, the retaining focus unit 11 is, with regard to software as well as hardware, completely integrated in the control unit 9 of the microscope 1. As a result, the retaining focus unit 11 can be operated via the output/input unit 10 and is part of the software environment of the control unit 9, allowing for the retaining focus unit 11 to communicate directly with all system components of the control unit 9 and/or the microscope 1. However, the system components can also communicate with the retaining focus unit 11. For example, information from the retaining focus unit 11 can be prompted by the system components and used for the operation of the microscope 1.

Due to said complete integration of the retaining focus unit 11 in the control unit 9 of the microscope 1, no further control panel for the retaining focus unit 11 is required. All functionalities of the retaining focus unit 11 can be operated via the output/input unit 10. The selected operating conditions or also failure modes of the retaining focus unit 11 can, in turn, be displayed for the operator via the output/input unit 10. The output/input unit 10 can therefore be used for the interactive control and/or adjustment of the retaining focus unit 11.

Therefore, in the microscope, according to the invention, the retaining focus unit 11 can be directly integrated in the control concept of the microscope 1 without making a further control panel necessary.

The hardware element 12 of the retaining focus unit, which, e.g., can be a controller, can be connected to the internal bus system (not shown) of the microscope 1. The retaining focus unit 11 can be integrated in the control unit 9 in such a way that the control unit 9 and the retaining focus unit 11 can be switched on and off separately from one another.

If the control unit 9 is switched off and the retaining focus unit 11 is switched on, the retaining focus unit 11 will make a one-time attempt to contact the control unit 9 via the bus system. This is not possible due to the switched-off control unit 9.

If the control unit 9 is now switched on, it will query for existing components. In this case, the retaining focus unit 11 would log in. As a result, the respective outputs and displays on the output/input unit 10 are adjusted in order to be able to control the retaining focus unit 11 as well.

If the control unit 9 is switched on but no contact is apparent with the retaining focus unit 11, no output is produced on the output/input unit with regard to the retaining focus unit. Once the retaining focus unit 11 is switched on, the log in of the control unit 9 takes place via the bus system and as a result, the display on the output/input unit 10 is updated.

Due to the integration of the retaining focus unit 11 in the control unit 9, the retaining focus unit 11 can access all technically relevant data of the microscope 1. Said technically relevant data include particularly the lens type with nosepiece position when the imaging optics 5 are designed as nosepiece with several lens systems, and the lens data, derived from the respective lens system, such as magnification, aperture, immersion, depth of field, applied wavelength range.

Moreover, said technically relevant data can also include the applied illumination (e.g., reflected light, transmitted light, fluorescence), LSM activities (LSM=laser scanning microscope), laser exposure, z-position of the stage, the status of other components in the system as well as a utilized contrast method, if applicable (such as DIC=differential interference contrast, Ph=phase contrast, VAREL contrast, . . . ).

In case of a connected incubator, the technically relevant data of the incubator (such as temperature) can, of course, also be taken into account.

In addition, these components can be influenced directly by the retaining focus unit 11. For example, the retaining focus unit 11, if necessary, can effect a lens system change, activate a shutter and/or aperture, read and/or update (i.e., write) the ACR content (ACR=automatic component recognition) of lens systems, or even control the intensity of the illumination of the microscope.

In order for the retaining focus unit 11 to maintain the predetermined focal position, knowledge about the imaging optics 5 is required, particularly the magnification of the imaging optics 5. Under certain circumstances this might either not be known to the control unit 9 or the present entry may be incorrect. In such case, the retaining focus unit 11 would not be able to securely maintain the predetermined focal position.

The retaining focus unit 11 provides the option of determining the magnification of the imaging optics 5.

Figure 2:
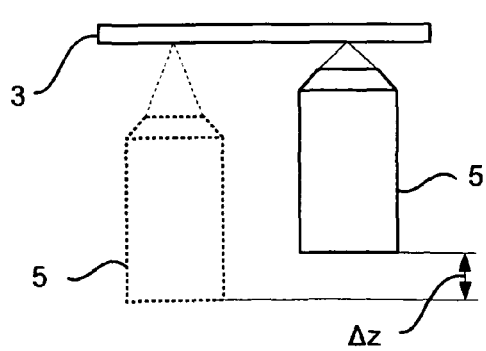
FIG. 2 is a depiction for clarifying the determination of the magnification of the imaging optics 5.
Figure 3:
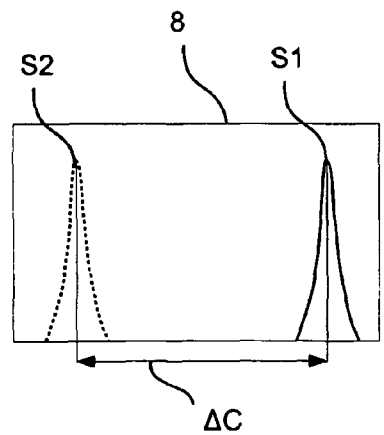
FIG. 3 is a depiction of the signals measured by means of the detector 8 during the determination in accordance with FIG. 2.

Thereto, a glass plate with sufficient thickness (approx. 1 mm), preferably an object slide or a mirror, is placed as a sample on the stage 2. Onto said sample 3, it is focused in such a way that the imaging optics 5 is positioned in the right position, schematically shown in FIG. 2, relative to the sample 3. On the focus measurement sensor 8 this leads to the right signal S1 (FIG. 3).

Then the menu item for the determination of the magnification of the imaging optics 5 is activated via the output/input unit 10. Consequently, the retaining focus unit 11 controls the motion unit 6 in such a way that the distance between the imaging optics 5 and the sample 3 is increased. The distance is increased until the signal on the focus measurement sensor 8 has moved from the right to the left side (FIG. 3). The subsequently present signal S2 is shown as dotted line in FIG. 3. Similarly, the present position of the imaging optics 5 is shown as dotted line in FIG. 2.

From the change in distance Δz as well as the present signal shift AC on the image sensor 4, the magnification v of the imaging optics 5 can be calculated with the following formula (1):

$$v = \sqrt{\frac{k1 \cdot n \cdot \Delta C \mu m}{\Delta z}}$$

This formula results for the concrete design of the microscope from FIG. 1, according to the invention, from the following formula (2):

$$\Delta z = \frac{\sin\alpha \cdot n \cdot k2 \cdot \Delta C}{2 \cdot (f'_P / f_{TL})^2 \cdot v^2} = \frac{k1 \cdot n}{v^2} \cdot \Delta C \mu m.$$

The formula (2) is based on the assumption that not depicted focusing optics in front of the focus measurement sensor 8 exhibit a test lens with the focal length $f_P$ and a tube lens with the focal length $f_{TL}$, that an angle α exists between the optical axis of the focusing optics and the vertical line of the focus measurement sensor 8, that n is the refractive index of the immersion medium, and that the distance of adjacent pixels of the focus measurement sensor 8 equals k2.

With the values of α=50°, $f^1_P$=16.559 mm, $f_{TL}$=164.5 mm, and k2=6.7 μm, one arrives at the above formula (1) for magnification v, whereby k1=sinα·k2=253.26. The refractive index n for air is, e.g., 1, for water, e.g., 1.328, and for glycerol, e.g., 1.4477.

The magnification v of the imaging optics 5 thus calculated is then utilized by the retaining focus unit 11 for the retaining focus control when, e.g., no magnification is available (for example, from the system data of the microscope) to the retaining focus unit.

For example, it is also possible to have said determination of the magnification v of the imaging optics 5 effected automatically during the control of the retaining focus, in case certain threshold values of the control mode (speed, accuracy, etc.) are exceeded.

Of course, it is also possible to display a menu item via the output/input unit 10 which allows the operator to have the described determination of the magnification of the imaging optics 5 carried out by the retaining focus unit 11. The thus determined magnification can then, for the use of ACR lens systems, be stored in the respective ACR chip of the lens system. Of course, this can be carried out in dependence of a required input by the operator.

The retaining focus unit 11 can be designed in such a way that it reads and utilizes all adjustment parameters required for the control when it is switched on by the operator. This can take place automatically and without further knowledge by the operator when, e.g., ACR lens systems are applied. In said lens systems, all required information is stored in the ACR chip assigned to the lens system. Hereby, the definition of the lens system with its adjustment parameters is automatically stored in the control unit 9 as soon as the operator activates the input.

Alternatively, it is possible to read the ACR information anew at every lens system change and to store it in the control unit 9 in order to keep the lens entry as current as possible.

Furthermore, it is possible to define the lens system manually via the output/input unit 10 or also via externally accessing software. Hereby, the assignment of the lens system can be simplified by entering the lens name or the order number. The required parameters for the retaining focus unit 11 are then concurrently entered automatically.

It is also possible for the retaining focus unit 11 to store its obtained findings and/or parameters in the memory chip of the lens system insofar as an appropriate lens system is utilized. In addition or alternatively, the obtained findings and/or parameters can be stored in the system memory of the control unit 9. In this case, said findings and/or parameters would also be available for externally accessing components.

Frequently, the samples 3 are not placed directly on the stage 2, i.e., a cover glass (for upright microscopy, not shown) is frequently placed between the sample 3 and the imaging optics 5, or the bottom of a culture vessel and/or a Petri dish is placed between the sample 3 and the imaging optics, as, e.g., in inverted microscopy, indicated in FIG. 1. For a satisfactory image acquisition it is necessary to know exactly the thickness of the cover glass and/or the bottom thickness. In this case, the thereto designed lens systems of the imaging optics can be corrected accordingly with regard to the known thickness by means of a dial.

Figure 4:
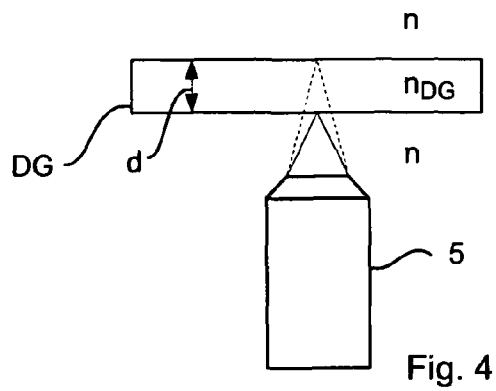
FIG. 4 is a depiction for clarifying the determination of the cover glass thickness.
Figure 5:
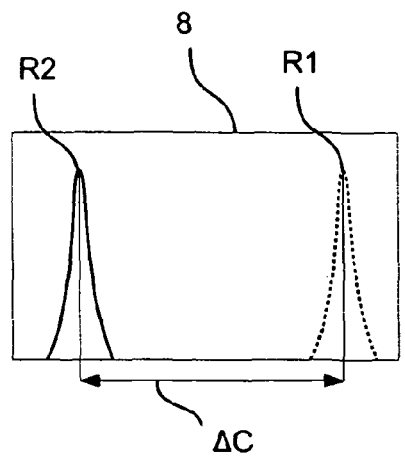
FIG. 5 is a depiction of the measurement results of the detector 8 for the determination of the cover glass thickness, according to FIG. 4.

In order to exactly determine said thickness, the two reflections, e.g., which are produced on both boundaries of the cover glass (hereinafter, the term cover glass shall apply to cover glass but also to the bottom of a vessel in which the sample is placed) to the surrounding medium 11 (as is indicated in FIG. 4), can be evaluated. The two reflections R1, R2 can be detected with the focus sensor 8, whereby the reflection R1 is the reflection on the top side of the cover glass DG, and the reflection R2 is the reflection on the bottom side of the cover glass DG. The magnification of the imaging optics 5 must be selected in such a way that both reflections R1, R2 are mapped on the focus measurement sensor 8.

From the distance ΔC between the two reflections R1 and R2, available on the sensor 8, the thickness d of the cover glass DG can be determined in accordance with the following formula:

$$d = \Delta z \cdot \frac{n_{DG}}{n},$$

whereby Δz results from the above formula (2) with the known value AC and the magnification factor v of the imaging optics 5. n is once again the refractive index of the immersion medium and $n_{DG}$ the refractive index of the cover glass.

Figure 6:
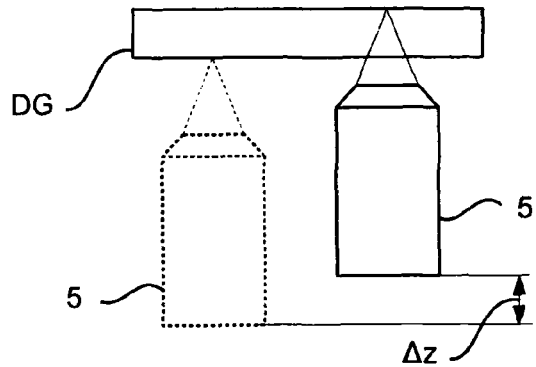
FIG. 6 is a depiction for clarifying the cover glass thickness in accordance with a further embodiment.
Figure 7A:
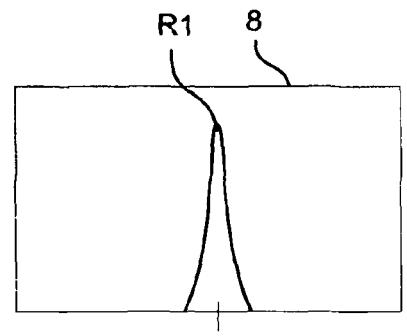
FIGS. 7a and 7b are depictions of the measuring signals of the sensor 8 for the determination of the cover glass thickness, according to FIG. 6.

Alternatively, the magnification of the imaging optics 5 can be selected in such a way that only the reflection of the front or the rear boundary is detected by the focus measurement sensor 8. Thereby, in a first position, preferably the reflection R1 on the top side is initially determined (FIGS. 6 and 7*a*).

Figure 7B:
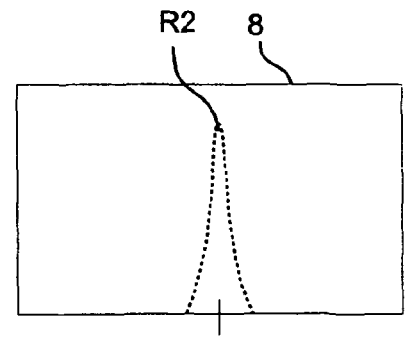
Figure 8:
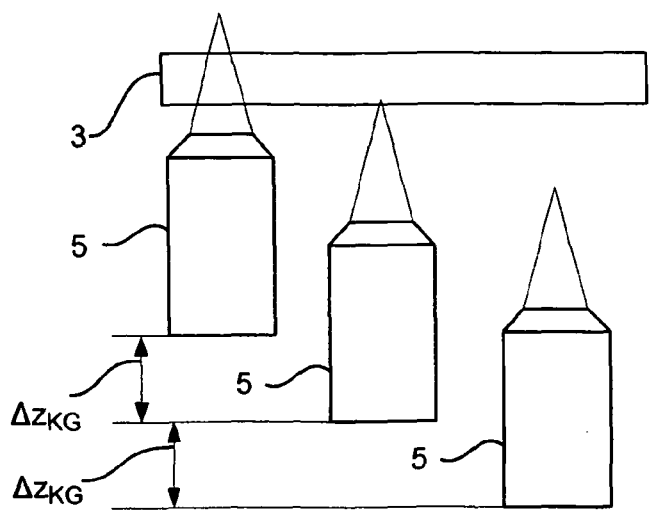
FIG. 8 is a depiction for clarifying the determination of the focal position.

Then the distance between the cover glass DG and imaging optics 5 is changed in such a way that the reflection R2 of the bottom side (dotted depiction in FIGS. 6 and 7*b*) lies in the same position in the focus measurement sensor 8 as the first reflection R1. These steps are preferably executed automatically, e.g., upon request by the operator.

From the thereto necessary distance change Δz, the cover glass thickness d can be calculated in accordance with the above formula 3.

Focus tracking can be executed with the retaining focus unit 11 as follows. At first, the distance between the imaging optics 5 and the sample 3 is adjusted to a minimal value by the operator. As a result, the imaging optics are very close to the sample. Then the menu item focus tracking is selected via the output/input unit 10.

Figure 9:
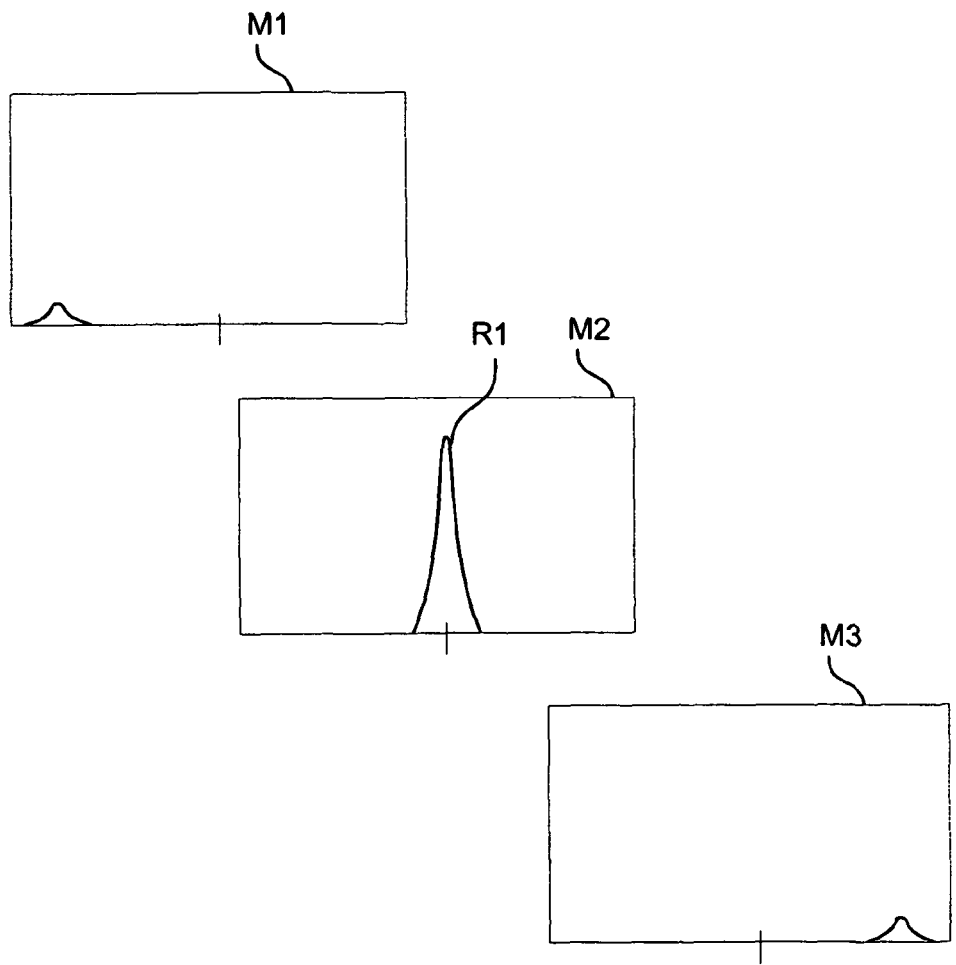
FIG. 9 is a depiction of the measuring signals of the sensor 8 for the determination of the focal position, according to FIG. 8.

Then the retaining focus unit 11 controls the motion unit 6 in such a way that the distance between sample 3 and imaging optics 5 is increased. During said distance change, the retaining focus signals, determined by means of the focus measurement sensor 8, are detected and stored preferably in defined path distances $\Delta z_{KG}$. The path distances $\Delta z_{KG}$ are preferably selected in such a way that the retaining focus signals of the focus measurement sensor 8 overlap in z-direction (observational direction). This is shown schematically in FIG. 9 in such a way that the respective images of the focus measurement sensor 8 are depicted as overlapping. By means of the focus measuring signals M1-M3, the predetermined focal position is then determined which is utilized for the retaining focus control. For example, the maximum amplitude of the focus signal from the focus signals M1-M3 as predetermined focal position can be inferred as the most likely focal plane and therefore predetermined focal position.

If imaging optics are used whereby the lens system does not utilize an immersion medium and can therefore be called an air microscope lens system, at least two evaluable retaining focus signals, which correspond to the boundary between the upper glass bottom plane and the sample 3 (e.g., immersion liquid—usually water—of cells) as well as the boundary between the lower glass bottom plane and the air, can be detected while tracking the expected focus area. If the reflection of the boundary between the lower glass bottom plane and the air is used as reference area, which lies parallel to the focal plane, the focal plane must be approached offset by the bottom glass thickness. Thereto, the bottom glass thickness must be known, determined or entered.

With water-immersed lens systems, two somewhat similar retaining focus signals can be detected. The first signal is very close to the focal plane and thereby recognized as the most likely focal plane.

For immersion media, which exhibit a refractive index near the refractive index of the glass bottom, the reflection between glass bottom and immersion medium does not occur. In this case, the reflection between the sample (e.g., the immersion medium of the cells) and culture vessel material, which once again is very close to the focal plane, is detected with high probability.

Preferably, evaluations by means of commonly applied retaining focus criteria are executed for exposures by means of the focus measurement sensor. Hereby, filter technologies and threshold value considerations can be applied which perform preselections in order to determine whether the detected signal is a retaining focus signal at all. Therefore, it is possible that, e.g., the retaining focus signal is detected in only one exposure M2. The other exposures M1, M3 will signal that no focus can be expected therein.

However, if the retaining focus unit 11 detects several areas (exposures M1-M3) as possible focus, since retaining focus signals are also detected in these exposures, the areas and/or exposures can be evaluated in accordance with the aforementioned criteria, amplitude, noise performance, signal quality and/or the realistic evaluation of the plane to the starting point, etc.

The invention claimed is:

1. A microscope with
   a stage for supporting a sample to be examined,
   an image sensor,
   imaging optics for mapping the sample onto the image sensor,
   a motion unit for adjusting the distance between stage and imaging optics,
   a control unit for controlling of an image acquisition of the sample, and
   a retaining focus unit for maintaining a predetermined focal position for temporally spaced image acquisitions of the sample, whereby the retaining focus unit contains at least one hardware element and one software module, wherein
   the retaining focus unit, with regard to software as well as hardware, is entirely integrated in the control unit;
   wherein the microscope has a plurality of modes of operation and each of the modes of operation can be implemented with the retaining focus unit; and
   wherein one of the modes of operation is determination of a magnification of the imaging optics.

2. The microscope, according to claim 1, wherein one of the modes of operation is one of the set of: determination of a thickness of a cover glass, under which the sample is placed, and, determination of a thickness of a bottom of a vessel in which the sample is placed.

3. The microscope, according to claim 2, wherein one modes of operation is determination of a predetermined focal plane.

4. The microscope, according to claim 1, wherein the retaining focus unit controls a motion unit and a plurality of additional components of the microscope.

5. The microscope, according to claim 4, wherein the retaining focus unit, for maintaining the predetermined focal position, accesses data which describe one or more technical properties of the microscope.

6. The microscope, according to claim 4, wherein the control unit further comprises an assigned memory, which the retaining focus unit can access through writing and/or reading and wherein the plurality of additional components of the microscope can access the memory of the control unit.

7. The microscope, according to claim 1, wherein the retaining focus unit, for maintaining the predetermined focal position, takes into account a magnification of the imaging optics.

8. The microscope, according to claim 1, wherein the control unit further comprises an assigned memory, which the retaining focus unit can access through writing and/or reading.

9. The microscope, according to claim 1, wherein the imaging optics further comprise at least one lens system with a memory, which the retaining focus unit can access through at least one of writing and reading.

10. The microscope, according to claim 9, wherein additional components of the microscope can access the memory of the lens system.

11. A microscopy method, comprising the steps of:
    mapping under the control of a control unit having fully integrated software and hardware, temporally spaced images of a sample to be examined via imaging optics onto an image sensor,
    providing a retaining focus unit, which contains at least one hardware element and one software module,
    maintaining with the retaining focus unit a predetermined focal position for the temporally spaced image acquisitions of the sample;
    determining a thickness of a cover glass, under which the sample is placed, or a thickness of a bottom of a vessel in which the sample is placed by the retaining focus unit;
    adjusting a predetermined focal plane for image acquisition by the retaining focus unit; and
    determining a magnification of the imaging optics by way of the retaining focus unit.

12. The method, according to claim 11, wherein determining the thickness further comprises illuminating by the retaining focus unit the cover glass and/or the vessel bottom and detecting under equal imaging conditions reflections, produced at a top and a bottom side of the cover glass and/or the vessel bottom, and therefrom deriving the thickness to be determined.

13. The method, according to claim 11, wherein determining the thickness further comprises illuminating by the retaining focus units the cover glass and/or the vessel bottom, changing a distance between the imaging optics and the cover glass and/or the vessel bottom in such a way that reflections are detected in temporal sequence at a top and a bottom side of the cover glass and/or the vessel bottom, thereby identifying a distance change and deriving the thickness to be determined by taking the distance change into account.

14. The method, according to claim 11, further comprising, for the determination of the magnification of the imaging optics,
  - detecting by the retaining focus unit the sample to be examined via the imaging optics; and
  - wherein a distance between the imaging optics and the sample varies, utilizing a resulting change of a detected signal with regard to a change in distance between the imaging optics and the sample for determination of the magnification of the imaging optics.

15. The method, according to claim 14, further comprising utilizing a focus measurement sensor for determining the resulting change in distance as a shift of the detected signal in a plane of the focus measurement sensor of the retaining focus unit.

* * * * *

UNITED STATES PATENT AND TRADEMARK OFFICE
CERTIFICATE OF CORRECTION

| | | |
|---|---|---|
| PATENT NO. | : 8,563,912 B2 | Page 1 of 1 |
| APPLICATION NO. | : 12/937970 | |
| DATED | : October 22, 2013 | |
| INVENTOR(S) | : Reiner Mitzkus et al. | |

It is certified that error appears in the above-identified patent and that said Letters Patent is hereby corrected as shown below:

In the Specification

Col. 7, line 2, delete "AC" and insert --$\Delta C$--

Col. 8, line 45, delete "AC" and insert --$\Delta C$--

Signed and Sealed this
Twenty-second Day of July, 2014

Michelle K. Lee
*Deputy Director of the United States Patent and Trademark Office*